United States Patent
Mitsuyasu et al.

(10) Patent No.: US 7,173,100 B2
(45) Date of Patent: Feb. 6, 2007

(54) RECEIVING-LAYER-FORMING RESIN FOR USE IN THERMAL-TRANSFER IMAGE-RECEIVING SHEET AND THERMAL-TRANSFER IMAGE-RECEIVING SHEET USING SUCH A RESIN

(75) Inventors: Naoyuki Mitsuyasu, Shinjuku-ku (JP); Masayasu Yamazaki, Shinjuku-ku (JP); Taro Suzuki, Shinjuku-ku (JP); Minoru Takahashi, Chuo-ku (JP); Hirotoshi Kizumoto, Otsu (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 11/092,778

(22) Filed: Mar. 30, 2005

(65) Prior Publication Data
US 2005/0222375 A1 Oct. 6, 2005

(30) Foreign Application Priority Data
Mar. 31, 2004 (JP) .............................. 2004-105265

(51) Int. Cl.
*C08G 63/02* (2006.01)

(52) U.S. Cl. ...................... 528/272; 430/199; 430/211; 430/222; 430/531; 525/445; 528/298; 528/302; 528/307

(58) Field of Classification Search ................ 430/199, 430/222, 211, 531; 525/445; 528/272, 298, 528/302, 307
See application file for complete search history.

(56) References Cited

U.S. PATENT DOCUMENTS 5,258,353 A * 11/1993 MacDonald et al. ........ 503/227
5,342,819 A *  8/1994 Takiguchi et al. .......... 503/227
5,457,081 A * 10/1995 Takiguchi et al. .......... 503/227

FOREIGN PATENT DOCUMENTS

| EP | 0 526 645 A1 | 2/1993 |
|---|---|---|
| EP | 0 562 578 A1 | 9/1993 |
| JP | 57-107885 A | 7/1982 |
| JP | 60-64899 A | 4/1985 |
| JP | 62-105689 A | 5/1987 |
| JP | 8-108636 A | 4/1996 |
| JP | 2002-264543 A | 9/2002 |

* cited by examiner

*Primary Examiner*—Terressa Boykin
(74) *Attorney, Agent, or Firm*—Birch, Stewart, Kolasch & Birch, LLP.

(57) ABSTRACT

The present invention relates to a receiving-layer-forming polyester resin for use in a thermal-transfer image-receiving sheet, comprising:
not less than 70 mol % of isophthalic acid and not more than 30 mol % of terephthalic acid as acid components; and
not less than 30 mol % of diols having an alicyclic structure and not more than 30 mol % of ethylene glycol as diol components, and
a thermal-transfer image-receiving sheet with a receiving layer formed on at least one of surfaces of the substrate sheet, in which the receiving layer is formed by such a receiving-layer-forming polyester resin.

8 Claims, No Drawings

RECEIVING-LAYER-FORMING RESIN FOR USE IN THERMAL-TRANSFER IMAGE-RECEIVING SHEET AND THERMAL-TRANSFER IMAGE-RECEIVING SHEET USING SUCH A RESIN

BACKGROUND OF THE INVENTION

1. Field of the Invention

The present invention relates to a receiving-layer-forming resin for a thermal-transfer image-receiving sheet, which is superposed on a thermal-transfer sheet and used, and also concerns a thermal-transfer image-receiving sheet using such a resin.

2. Description of the Related Art

With respect to an image-forming method in which thermal transferring processes are utilized, a method (sublimation-type thermal transfer system) in which a thermal transfer sheet formed by allowing a substrate sheet such as paper and a plastic film to support a sublimable dye serving as a recording material and a thermal transfer image-receiving sheet in which a receiving layer for the dye is formed on paper or a plastic film are superposed on each other so that a full-color image is formed has been known. In this method, since the sublimable dye is used as the color material, the density and tone are freely adjustable on a dot basis so that it is possible to clearly form a full-color image faithful to an original document on an image-receiving sheet; therefore, this method is applied to color-image forming processes in apparatuses such as digital cameras, videos and computers. The resulting image is a high-quality image that corresponds to a silver-salt photograph.

In recent years, there have been increasing demands for high-quality images, and images, which have not only a high dyeing property (sensitivity) but also high environmental resistance typically represented by light resistance to light exposure and anti-fingerprint property, have been required. With respect to a receiving-layer-forming resin for the thermal-transfer image-receiving sheet, resins mainly containing a saturated polyester resin have been proposed (for example, see Japanese Patent Application Laid-Open Nos. 57-107885, 60-64899 and 62-105689). However, one of problems with the conventional polyester resins is that it is difficult to sufficiently satisfy both of the above-mentioned properties.

With respect to a binder for the thermal transfer sheet, an acetal-based resin (in particular, acetal resin) has been mainly used, and in the case when a polyester-based resin is used as the receiving layer, the acetal-based resin and a polyester-based resin tend to be thermally fused and joined to each other due to heat generated by a thermal head upon printing, and the resulting problems are that a big peeling sound is generated upon peeling, that dye layer itself is transferred, and that a so-called abnormal transfer in which the receiving layer is peeled from the substrate tends to occur; consequently, it is difficult to maintain a desirable releasing property between the thermal-transfer sheet and the image-receiving sheet.

In order to ensure a sufficient releasing property, for example, techniques in which a large amount of a releasing agent such as silicone is added to the receiving layer have been proposed (for example, Japanese Patent Application Laid-Open Nos. 08-108636 and 2002-264543). However, these techniques cause problems such as a poor printed-article preserving property and a failure in transferring the protective layer although a sufficient releasing property is obtained, making it difficult to maintain the releasing property and the protective-layer transferring property in a well-balanced manner.

SUMMARY OF THE INVENTION

The present invention is to provide a thermal-transfer image-receiving sheet that provides a superior dyeing property (sensitivity) and a superior releasing property between a thermal transfer sheet and an image-receiving sheet upon printing an image, and also achieves superior environmental resistant properties (anti-fingerprint property and light resistance).

The above objective is achieved by a receiving-layer-forming polyester resin, comprising: less than 70 mol % of isophthalic acid and not more than 30 mol % of terephthalic acid as acid components; and not less than 30 mol % of diols having an alicyclic structure and not more than 30 mol % of ethylene glycol as diol components.

DETAILED DESCRIPTION OF THE INVENTION

The present invention provides:
(1) a receiving-layer-forming polyester resin for use in a thermal-transfer image-receiving sheet comprising:
not less than 70 mol % of isophthalic acid and not more than 30 mol % of terephthalic acid as acid components, and
not less than 30 mol % of diols having an alicyclic structure and not more than 30 mol % of ethylene glycol as diol components;
(2) the receiving-layer-forming polyester resin for use in a thermal-transfer image-receiving sheet according to the above (1), wherein the diol having an alicyclic structure is selected from the group consisting of 1,4-cyclohexane dimethanol, tricyclodecane dimethanol and a mixture thereof;
(3) The receiving-layer-forming polyester resin for use in a thermal-transfer image-receiving sheet according to the above (1) or (2), which has a glass transition temperature in a range from not less than 50° C. to not more than 75° C., a specific gravity in a range from not less than 1.24 to not more than 1.35 and a number-average molecular weight in a range from not less than 10,000 to not more than 50,000;
(4) a thermal-transfer image-receiving sheet, comprising:
a receiving layer containing one or more kinds of thermoplastic resins, which is formed on at least one of surfaces of a substrate sheet,
wherein the polyester resin of one of the above (1) to (3) is used as the thermoplastic resin.

With respect to acid components of the polyester resin of the present invention, examples thereof include: aromatic dicarboxylic acids, such as terephthalic acid, isophthalic acid, orthophthalic acid, 1,5-naphthalene dicarboxylic acid, 2,6-naphthalene dicarboxylic acid, 4,4'-diphenyl dicarboxylic acid, 2,2'-diphenyl dicarboxylic acid, 4,4'-diphenyl ether dicarboxylic acid and 5-sodium sulfoisophthalic acid; aliphatic dicarboxylic acids, such as succinic acid, adipic acid, azelaic acid, sebacic acid, dodecane dicarboxylic acid, dodecinyl succinic acid and dimer acid; alicyclic dicarboxylic acid, such as 1,4-cyclohexane dicarboxylic acid, 1,3-cyclohexane dicarboxylic acid, 1,2-cyclohexane dicarboxylic acid, 4-methyl-1,2-cyclohexane dicarboxylic acid, 1,2-bis(4-carboxycyclohexyl)methane and 2,2-bis(4-carboxycyclohexyl)propane; and polycarboxylic acids, such as trimellitic anhydride and pyromellitic anhydride. In the case when the entire acid components are set to 100 mol %, among these acid components, the amount of isophthalic acid is set to not less than 70 mol % and the amount of terephthalic acid is set to not more than 30 mol %, and preferably, the amount of isophthalic acid is set to not less than 80 mol % and the amount of terephthalic acid is set to not more than 20 mol %. The amount of isophthalic acid may be set to 100 mol %. When the amount of terephthalic acid exceeds 30 mol %, the light resistance tends to be lowered. The amount of aliphatic dicarboxylic acid and/or alicyclic dicarboxylic acid exceed 30 mol %, the anti-fingerprint property tends to be lowered.

With respect to diols having an alicyclic structure to be used as the diol component in the polyester resin in the present invention, examples thereof include: 1,4-cyclohexane dimethanol, 1,3-cyclohexane dimethanol, 1,2-cyclohexane dimethanol, tricyclodecane dimethanol, alkylene oxide adducts of tricyclodecane dimethanol, hydrogenated bisphenol A and alkylene oxide adducts of hydrogenated bisphenol A. Among these, 1,4-cyclohexane dimethanol and/or tricyclodecane dimethanol are preferably used. With respect to the tricyclodecane dimethanol, 3(4), 8(9)-bis(hydroxymethyl)-tricyclo[5,2,1,0$^{2,6}$]decane is preferably used. With respect to the polyester resin of the present invention, in the case when the entire diol components are set to 100 mol %, the amount of diols having an alicyclic structure is preferably set to not less than 30 mol %, preferably not less than 35 mol % among the diol components. Although not particularly limited, the upper limit may be set to 100 mol %. When the amount of diols having an alicyclic structure is less than 30 mol %, the light resistance tends to be lowered. In the present specification, the term, "hydrogenated compound", refers to an alicyclic compound formed by adding hydrogen atoms to an aromatic ring.

With respect to the diol components other than diols having an alicyclic structure, examples thereof include: ethylene glycol, propylene glycol, 1,3-propane diol, 2-methyl-1,3-propane diol, 1,2-butane diol, 1,3-butane diol, 1,4-butane diol, 1,5-pentane diol, 1,6-hexane diol, 1,9-nonane diol, 1,10-dodecane diol, diethylene glycol, triethylene glycol, dipropylene glycol, neopentyl glycol, 2-butyl-2-ethyl-1,3-propane diol, 2-methyl-1,3-propane diol, 3-methyl-1,5-pentane diol, 2,2,4-trimethyl-1,3-pentane diol, 2-methyloctane diol, neopentylhydroxy pivalate and an alkylene oxide adduct of bisphenol A. Moreover, polyethers such as polytetramethylene glycol, polypropylene glycol and polyethylene glycol may also be used. Among these, 2-methyl-1,3-propane diol, diethylene glycol, neopentyl glycol, 1,4-butane diol, 1,5-pentane diol and 1,6-hexane diol are preferably used. In addition to the diol components, a slight amount of polyol, such as trimethylol propane, trimethylol ethane and glycerin, may be copolymerized within a range so as not to impair its properties of the polyester resin of the present invention. In the polyester resin of the present invention, among the diol components, the amount of ethylene glycol is set to not more than 30 mol %, preferably not more than 20 mol %. The amount of ethylene glycol exceeding 30 mol % tends to cause a reduction in the light resistance.

The number-average molecular weight of the polyester resin of the present invention is preferably set in a range from not less than 10,000 to not more than 50,000, preferably in a range from not less than 15,000 to not more than 40,000. When the number-average molecular weight is smaller than 10,000, the resulting receiving layer causes a reduction in the elastic modulus, and becomes insufficient in heat resistance, with the result that it becomes difficult to ensure a sufficient release property between a thermal-transfer sheet and an image-receiving sheet in some cases. From the viewpoint of increasing the elastic modulus, the greater the molecular weight, the better; therefore, although not particularly limited as long as problems, such as insolubility to a coating-solution solvent upon formation of the receiving layer and adverse effects to the bonding property between the receiving layer that has been coated and dried and the substrate sheet, are not raised, the molecular weight is preferably set to not more than 40,000, and to not more than 50,000 at most. The number-average molecular weight is given as a value measured through gel permeation chromatography (GPC) using polystyrene as the standard substance.

The specific gravity of the polyester resin of the present invention is preferably set in a range from not less than 1.24 to not more than 1.35, preferably from not less than 1.25 to not more than 1.30. When the specific gravity is smaller than 1.24, the anti-fingerprint property tends to be lowered. The specific gravity exceeding 1.35 tends to cause a failure in ensuring a sufficient dissolving property for a coating-solution solvent. The specific gravity is given as a value obtained by measuring a sample without bubbles in a calcium chloride aqueous solution adjusted to 30° C. More specifically, after the concentration of calcium chloride has been adjusted so that polyester resin is suspended in a middle portion between the liquid face and the bottom face of the aqueous solution, the specific gravity of the calcium chloride aqueous solution is measured by a hydrometer; thus, the specific gravity of the polyester resin is determined.

The glass transition temperature of the polyester resin of the present invention is preferably set in a range from not less than 50° C. to not more than 75° C., preferably from not less than 50° C. to not more than 65° C. The glass transition temperature of less than 50° C. tends to cause bleading in images that have been stored under a normal environment, and also tends to result in an insufficient heat resistance. The glass transition temperature exceeding 75° C. tends to cause a reduction in sensitivity. In the present invention, the "glass transition temperature" is obtained through the following processes: measurements are carried out from −50° C. to 200° C. at a temperature-rising rate of 20° C./min, and the temperature at an intersection between the extended line of the base line of not more than the glass transition temperature and the tangent line representing the maximum inclination in the transition portion is obtained as the "glass transition temperature."

A resin other than the polyester resin of the present invention may be mixed and used in the receiving layer of the thermal-transfer sheet of the present invention. With respect to the resin to be mixed, although not particularly limited, examples thereof include polyvinyl-based resin, polycarbonate-based resin, polyacrylic acid-based resin, polymethacrylic acid-based resin, polyolefin-based resin, cellulose derivative-based resin, polyether-based resin and polyester-based resin.

The receiving layer of the thermal-transfer sheet of the present invention is formed by applying a coating solution, prepared by dissolving or dispersing the above-mentioned polyester resin in an appropriate solvent, such as methyl ethyl ketone, toluene, xylene, ethyl acetate and acetone, or a mixed solution thereof, together with a release agent, a curing agent and other desired additives, to a substrate sheet by using a conventional method such as a wire bar, a roll coater or a gravure coater, to be dried thereon. The amount of coat is normally set in a range from 1 to 6 g/m$^2$, preferably from about 2 to 4 g/m$^2$.

With respect to the substrate sheet, various transparent or opaque plastic films and sheets and various kinds of paper, such as synthetic paper, wood free paper, art paper, coated paper, cast-coated paper, wallpaper, backed paper, synthetic resin or emulsion impregnation paper, synthetic plastics impregnation paper, paper with synthetic resin added therein and paperboard, are suitably used. The thickness of the substrate sheet, which may be optionally set, is normally set in a range from about 130 to 200 μm.

With respect to the release agent that is used so as to positively ensure the releasing property between a thermal-transfer sheet and an image-receiving sheet upon printing an image, for example, known release agents in this technical field, such as silicone oil, a phosphate-based compound and a fluorine-based compound, may be used. Silicone oil is preferably used. With respect to the silicone oil, modified silicones, such as epoxy-modified, alkyl-modified, amino-modified, fluorine-modified, phenyl-modified and epoxy-polyether-modified silicones; vinyl-modified silicone oil or OH-modified silicone having active hydrogen may be preferably used. The amount of the release agent is set in a range from 2 to 4% by weight, preferably from 2 to 3% by weight, with respect to 100 parts by weight of polyester resin. When the amount is too small, it is not possible to ensure the releasing property, and when the amount is too large, the pot life may be shortened in some cases.

The curing agent allows polyester to react with active hydrogen in the polyester to crosslink and cure a polyester resin so that a heat-resistant property is imparted to the receiving layer. With respect to the curing agent, isocyanate and chelate compounds or the like may be used. In the case when OH-modified silicone having active hydrogen is used as the release agent, the curing agent also reacts with the modified silicone to fix the release agent in the receiving layer so that it becomes possible to prevent the release agent from coming out onto the surface thereof; therefore, the use of these agents in combination is one of preferred embodiments of the present invention. An isocyanate compound of a non-yellowish-discoloration type is preferably used as the curing agent. Specific preferable examples thereof include: xylyene diisocyanate (XDI), hydrogenated XDI, isophrone diisocyanate (IPDI), hexamethylene diisocyanate (HDI) and adduct forms/burette forms, oligomers and prepolymers thereof. In addition to these, isocyanate compounds of a non-yellowish-discoloration type, which exert a reaction within a period of time required for drying the solvent of the receiving layer coating solution, may be used. The amount of the curing agent is set in a range from 1 to 4% by weight, preferably from 2 to 3% by weight with respect to 100 parts by weight of the polyester resin. When the amount is too small, it is not possible to increase the elastic modulus of the receiving layer, and in contrast, when the amount is too large, the elastic modulus becomes greater beyond the necessary level.

A catalyst may be added as a reaction assistant of the isocyanate compound, and any of known catalysts may be used. A tin-based catalyst, such as di(n-butyl)bis(lauroyloxy)tin (DBTDL), may be used as the typical catalyst. In addition to this, a dibutyl tin fatty acid-salt-based catalyst, a monobutyl tin fatty acid-salt-based catalyst, a monooctyl tin fatty acid-salt-based catalyst and dimers thereof or the like may be effectively used, and since the reaction rate becomes greater as the amount of tin per weight becomes greater, the kind, combination and amount of addition thereof are properly selected in accordance with the isocyanate compound to be used. In the case when an isocyanate compound of a block type is used, a block dissociation catalyst may be used in combination.

With respect to the thermal-transfer image-receiving sheet of the present invention, layers, such as an antistatic layer, a cushion layer and an intermediate layer to which a white pigment and a fluorescent whitening agent are added, may be formed between a substarate sheet and an image-receiving sheet, if necessary, or layers, such as an antistatic layer, a writing layer and an ink-jet receiving layer, may be formed on the surface of the substrate sheet on the side opposite to the receiving layer formation side.

A thermal-transfer sheet to be used when a thermal-transferring process is carried out by using the thermal-transfer image-receiving sheet of the present invention may be a conventional one in which a dye layer containing a sublimation-type dye is formed on a polyester film. In particular, when a thermal-transfer layer in which the dye ink layer contains a polyacetal-based resin (in particular, acetal resin) as a binder resin, with the protective layer being formed by a polyester-based resin, is used in combination, the effects of the present invention are exerted most effectively.

The application of the receiving-layer-forming polyester resin of the present invention makes it possible to provide a thermal-transfer image-receiving sheet that is superior in the sensitivity, releasing property and environmental resistance.

EXAMPLES

The following description will discuss examples of the present invention in more detail. In the following description, the term, simply indicated by "parts", refers to "parts by weight". The analyzing and evaluating processes of the resin were carried out in the following manner.

(Molecular Weight)

GPC measurements were carried out by using a gel permeation chromatography (GPC) of 150 c made by Waters Corporation in which tetrahydrofuran is used as an eluant, at a column temperature of 35° C. with a flow rate of 1 ml/min. Based upon the results, calculations were carried out to obtain measured values on a basis of polystyrene conversion. Shodexes KF-802, 804 and 806, made by Showa Denko K.K., were used as columns.

(Composition Analysis)

A nuclear magnetic resonance (NMR) analyzer, Gemini 200 made by Varian, Inc., was used so as to carry out a $^1$H-NMR analysis in chloroform D solvent, and the composition was determined based upon the resulting integration ratio.

(Glass Transition Temperature)

A sample to be measured (5 mg) was put into a sample pan made of aluminum and sealed, and measurements were carried out up to 200° C. at a temperature-rising rate of 20° C./min by using a differential scanning calorimeter DSC-200 made by Seiko Instruments Inc., and the temperature at an intersection between the extended line of the base line of not more than a glass transition temperature and the tangent line representing the maximum inclination in a transition portion was obtained as the glass transition temperature.

(Resin Specific Gravity)

A sample was immersed in a calcium chloride dihydrate aqueous solution at 30° C., and while the calcium chloride concentration was being changed, the specific gravity of the aqueous solution was measured by using a hydrometer, at the time when the sample came into a suspended state; thus, the corresponding value was defined as the resin specific gravity.

Synthesis of Polyester Resin (A)

To a reaction vessel provided with a thermometer, a stirring device and a Liebig condenser were loaded 63 parts of isophthalic acid, 0.7 parts of trimellitic acid, 18 parts of ethylene glycol, 28 parts of 1,4-butane diol, 33 parts of tricyclodecane dimethanol and 0.03 parts of tetrabutyl titanate, and this mixture was heated at 180 to 220° C. for 180 minutes to be subjected to an esterification reaction, and the resulting reaction system was decompressed to 5 mmHg in 20 minutes while being heated to 260° C. during this process. The reaction system was gradually decompressed to not more than 0.3 mmHg in 10 minutes, and then subjected to a polycondensation reaction at 260° C. for 60 minutes. Table 1 shows the characteristics of the resulting polyester resin (A). In the table, the composition ratio is indicated as mole ratio.

Syntheses of Polyester Resins (B) to (E)

The same processes as those of polyester resin (A) were carried out, and the characteristics of the resulting polyester resins (B) to (E) are shown in Table 1.

Syntheses of Polyester Resins (F) to (I)

The same processes as those of polyester resin (A) were carried out, and the characteristics of the resulting polyester resins (F) to (I) are shown in Table 1.

| | |
|---|---|
| Polyester resin shown in Table 1 (solid component 30%) | 100 parts by weight |
| X-62-1421B (Shin-Etsu Chemical Co., Ltd.) | 0.3 parts by weight |
| KF-615A (Shin-Etsu Chemical Co., Ltd.) | 0.3 parts by weight |
| A-14 (Takeda Pharmaceutical Co., Ltd.) | 1.5 parts by weight |
| S-CAT-52A (Sankyo Organic Chemicals Co., Ltd.) | 0.1 parts by weight |
| Methyl ethyl ketone/Toluene = 1/1 (weight ratio) | 50 parts by weight |

Here, X-62-1421B (Shin-Etsu Chemical Co., Ltd.) is a silicone-based release agent.

KF-615A (Shin-Etsu Chemical Co., Ltd.) is a silicone-based release agent.

A-14 (Takeda Pharmaceutical Co., Ltd.) is an isocyanate-based curing agent.

S-CAT-52A (Sankyo Organic Chemicals Co., Ltd.) is a tin-based catalyst.

(Evaluation)

With respect to the image-receiving sheets obtained as described above, evaluating processes were carried out on sensitivity, light resistance, anti-fingerprint property and resin heat resistance, and the results are shown in Table 2.

TABLE 1

| | | polyester resin | | | | | | | | |
|---|---|---|---|---|---|---|---|---|---|---|
| | | A | B | C | D | E | F | G | H | I |
| acid component | isophthalic acid | 99 | 80 | 100 | 74 | 85 | 75 | 50 | 39 | 10 |
| | terephthalic acid | | 20 | | | 15 | 25 | 50 | 61 | 80 |
| | 1,4-cyclohexane dicarboxylic acid | | | | 25 | | | | | |
| | sebacic acid | | | | | | | | | 10 |
| | trimellitic acid | 1 | | | 1 | | | | | |
| diol component | ethylene glycol | 12 | 14 | | 5 | | 58 | 50 | 61 | 17 |
| | 2-methyl-1,3-propanediol | | 51 | | | 32 | | | | |
| | 1,4-butanediol | 48 | | | | | | | | |
| | neopentyl glycol | | | | 8 | | 42 | | | 49 |
| | diethylene glycol | | | 39 | | 28 | | | | |
| | 1,4-cyclohexanedimethanol | | 35 | | | 40 | | | 19 | 34 |
| | tricyclodecanedimethanol | 40 | | 61 | 87 | | | | 20 | |
| | bisphenol A ethylene oxide adducts | | | | | | | 50 | | |
| specific gravity | | 1.250 | 1.245 | 1.247 | 1.219 | 1.248 | 1.260 | 1.257 | 1.276 | 1.221 |
| molecular weight (Mn) | | 20000 | 22000 | 8000 | 25000 | 17000 | 18000 | 20000 | 22000 | 19000 |
| Tg (° C.) | | 59 | 60 | 58 | 65 | 44 | 68 | 73 | 72 | 53 |

Examples 1 to 5, Comparative Examples 1 to 4

Synthetic paper YUPO EPG#150 (made by Oji-Yuka Synthetic Paper Co., Ltd.) having a thickness of 150 μm was used as a substrate sheet. A receiving layer coating solution having the following composition was applied to one surface thereof by using a wire bar at a rate so as to weigh 2.5 g/m² when dried, and then dried (at 130° C. for 40 seconds) to prepare an image-receiving sheet of the present invention.

TABLE 2

| | Examples | | | | | Comparative Examples | | | |
|---|---|---|---|---|---|---|---|---|---|
| | 1 | 2 | 3 | 4 | 5 | 1 | 2 | 3 | 4 |
| polyester resin | A | B | C | D | E | F | G | H | I |
| sensitivity | 5 | 5 | 5 | 4 | 6 | 5 | 5 | 3 | 5 |
| light resistance | 7 | 7 | 7 | 8 | 6 | 4 | 2 | 5 | 4 |
| releasing property | ◯ | ◯ | Δ | ◯ | Δ | ◯ | ◯ | ◯ | ◯ |

TABLE 2-continued

|  | Examples | | | | | Comparative Examples | | | |
| --- | --- | --- | --- | --- | --- | --- | --- | --- | --- |
|  | 1 | 2 | 3 | 4 | 5 | 1 | 2 | 3 | 4 |
| anti-fingerprint property | ○ | ○ | ○ | Δ | ○ | ○ | ⊚ | ○ | Δ |
| heat resistance | ○ | ○ | Δ | ○ | Δ | ○ | ○ | ○ | ○ |

Sensitivity: With respect to the sensitivity, evaluating processes were carried out as follows: a gradation pattern was printed by using a P-330 (made by Olympus Corporation), and measurements were carried out by using an RD-918 (made by SAKATA INX CORPORATION). The sensitivity of an image-receiving sheet obtained in comparative example 1 was defined as 5 points (standard), and those better than this were evaluated as 6 points, and those poorer than this were evaluated as 4 points. Those which were poorer than 4 points, but raised no problems in practical use were evaluated as 3 points.

Light Resistance

With respect to the light resistance, evaluating processes were carried out as follows: a gradation pattern was printed by using a P-330 (made by Olympus Corporation), and the resulting printed article was irradiated with light at 400 KJ by using a light resistance accelerator (Ci-4000: made by Atlas Material Testing Technology), and density changes and color differences of the images before and after the irradiation were evaluated by using a color meter (Macbeth densitometer, RD918; made by SAKATA INX CORPORATION) and a colorimeter (CR321; made by Konica Minolta Holdings Inc.) based upon the following criteria.

Light resistance: The light resistance of an image-receiving sheet obtained in comparative example 1 was defined as 4 points (standard), and those better than this were evaluated as higher points, while those poorer than this were evaluated as lower points. The greater the point, the higher the light resistance. The smaller the point, the lower the light resistance.

4 points indicate the light resistance in a level of currently-used products. Points greater than 5 indicate improved light resistance. The tendency is shown as follows: the greater the amount of introduced isophthalic acid, the greater the amount of introduced alicyclic diols and the smaller the amount of ethylene glycol, the further the light resistance is improved. It is considered that the low level of 2 points in the case of comparative example 2 is caused by a reduction in light resistance due to the introduction of bisphenol A ethylene oxide adducts.

Releasing Property

With respect to the releasing property, evaluating processes were carried out as follows: ten copies of a solid black image were continuously printed by using a P-330 (made by Olympus Corporation), and the resulting printed articles were visually observed based upon the following criteria.

○: Printing processes were available without any problems (with little peeling sound).

Δ: Although printing processes were available, peeling sound was big.

Anti-Fingerprint Property

With respect to the anti-fingerprint property, evaluating processes were carried out as follows: copies of a half-solid image were printed by using a P-330 (made by Olympus Corporation), and finger prints of 20 people were respectively put on image portions of the resulting printed articles, and the number of days required for the color in each image portion to disappear was obtained; thus, the numbers of days were compared with one another, and ranked in the following manner. The anti-finger print property exceeding "A" causes no problems in practical use.

⊚: One week or more

○: 3 days to one week

Δ: One to 2 days

Receiving Layer Heat Resistance

With respect to the receiving layer heat resistance, evaluating processes were carried out as follows: copies of a solid black image were continuously printed by using a P-330 (made by Olympus Corporation), and the resulting printed articles were evaluated based upon the same visual-observation criteria as the releasing property evaluation further taking dynamic viscoelasticity into consideration on the receiving layer, and ranked in the following manner.

○: Printing processes were available without any problems.

Δ: Although printing processes were available, peeling sound was big.

What is claimed is:

1. A receiving-layer-forming polyester resin for use in a thermal-transfer image-receiving sheet comprising:
    not less than 80 mol % of isophthalic acid and not more than 20 mol % of terephthalic acid as acid components, and
    not less than 30 mol % of diols having an alicyclic structure and not more than 30 mol % of ethylene glycol as diol components.

2. The receiving-layer-forming polyester resin for use in a thermal-transfer image-receiving sheet according to claim 1, wherein the diol having an alicyclic structure is selected from the group consisting of 1,4-cyclohexane dimethanol, tricyclodecane dimethanol and a mixture thereof.

3. The receiving-layer-forming polyester resin for use in a thermal-transfer image-receiving sheet according to claim 1, which has a glass transition temperature in a range from not less than 50° C. to not more than 75° C., a specific gravity in a range from not less than 1.24 to not more than 1.35 and a number-average molecular weight in a range from not less than 10,000 to not more than 50,000.

4. The receiving-layer-forming polyester resin for use in a thermal-transfer image-receiving sheet according to claim 2, which has a glass transition temperature in a range from not less than 50° C. to not more than 75° C., a specific gravity in a range from not less than 1.24 to not more than 1.35 and a number-average molecular weight in a range from not less than 10,000 to not more than 50,000.

5. A thermal-transfer image-receiving sheet, comprising:
    a receiving layer containing one or more kinds of thermoplastic resins, which is formed on at least one of surfaces of a substrate sheet,
    wherein the polyester resin of claim 1 is used as the thermoplastic resin.

6. A thermal-transfer image-receiving sheet, comprising:
    a receiving layer containing one or more kinds of thermoplastic resins, which is formed on at least one of surfaces of a substrate sheet,
    wherein the polyester resin of claim 2 is used as the thermoplastic resin.

7. A thermal-transfer image-receiving sheet, comprising:
    a receiving layer containing one or more kinds of thermoplastic resins, which is formed on at least one of surfaces of a substrate sheet,
    wherein the polyester resin of claim 3 is used as the thermoplastic resin.

8. A thermal-transfer image-receiving sheet, comprising:
a receiving layer containing one or more kinds of thermoplastic resins, which is formed on at least one of surfaces of a substrate sheet,
wherein the polyester resin of claim 4 is used as the thermoplastic resin.

* * * * *